Feb. 20, 1951   J. D. FRANCIS   2,542,500
HUMIDIFYING AND MINERAL SALTING DEVICE
Filed Dec. 10, 1948   5 Sheets-Sheet 1

INVENTOR.
JACK D. FRANCIS,
BY
Robert N Fulander
ATTORNEY.

Feb. 20, 1951 J. D. FRANCIS 2,542,500
HUMIDIFYING AND MINERAL SALTING DEVICE
Filed Dec. 10, 1948 5 Sheets-Sheet 2

INVENTOR.
JACK D. FRANCIS,
BY
Robert W Fulwider
ATTORNEY.

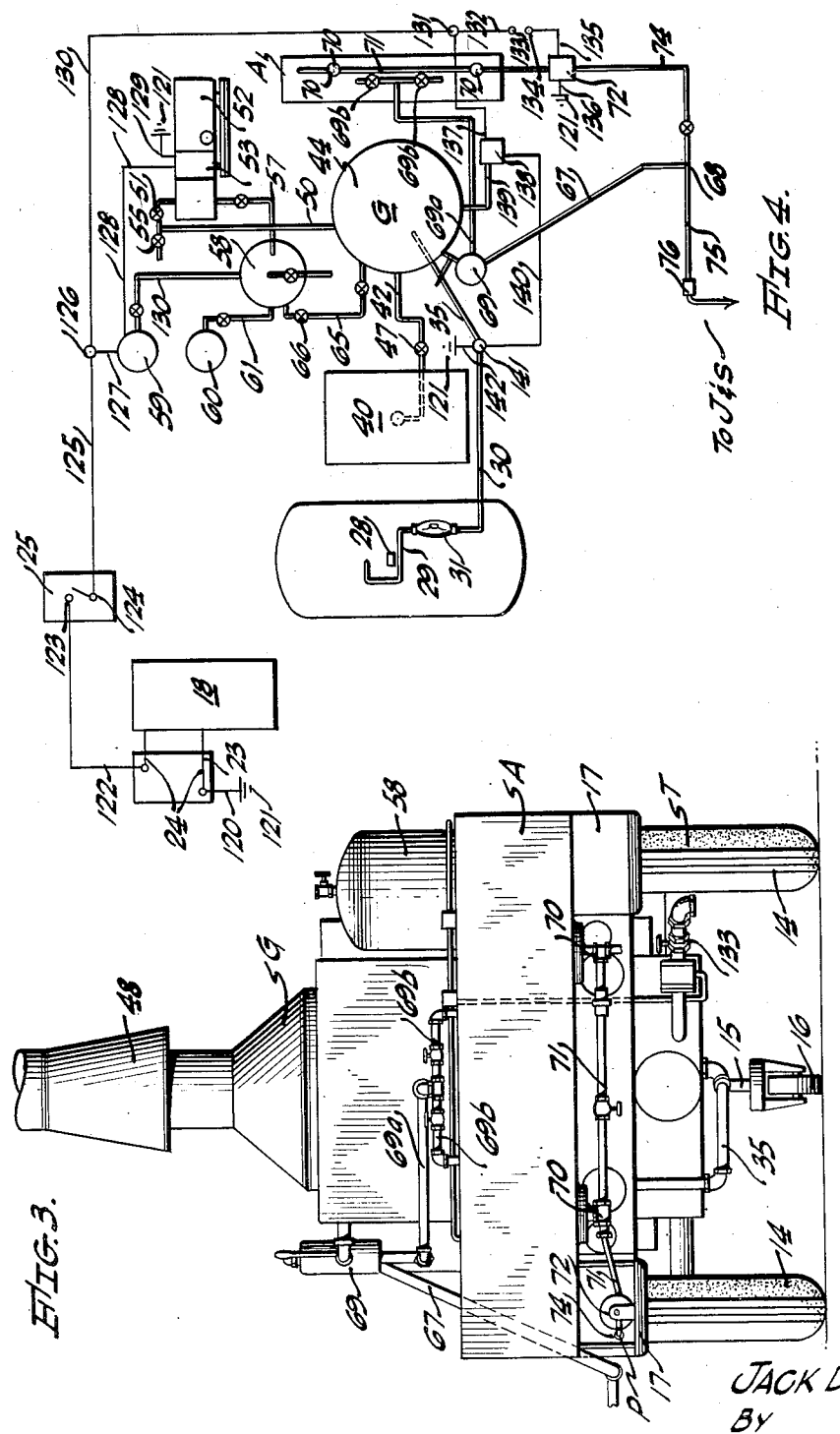

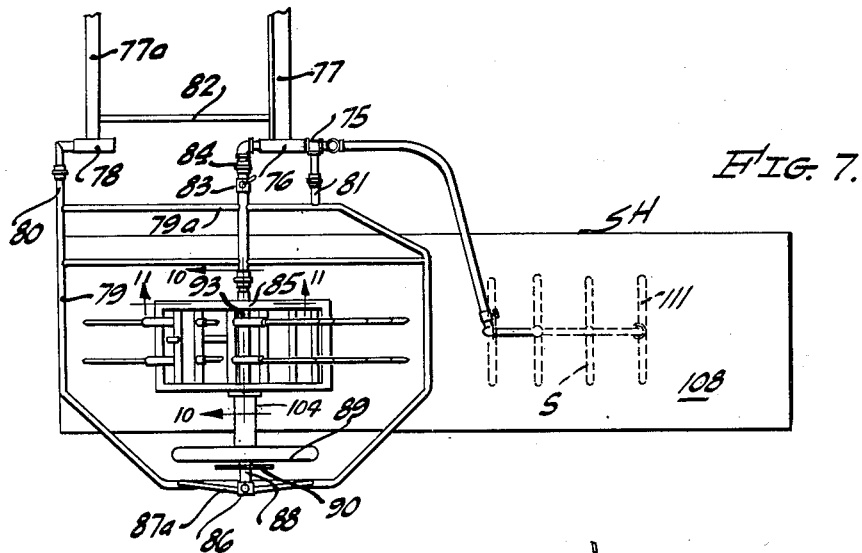

Feb. 20, 1951     J. D. FRANCIS     2,542,500
HUMIDIFYING AND MINERAL SALTING DEVICE
Filed Dec. 10, 1948     5 Sheets-Sheet 5
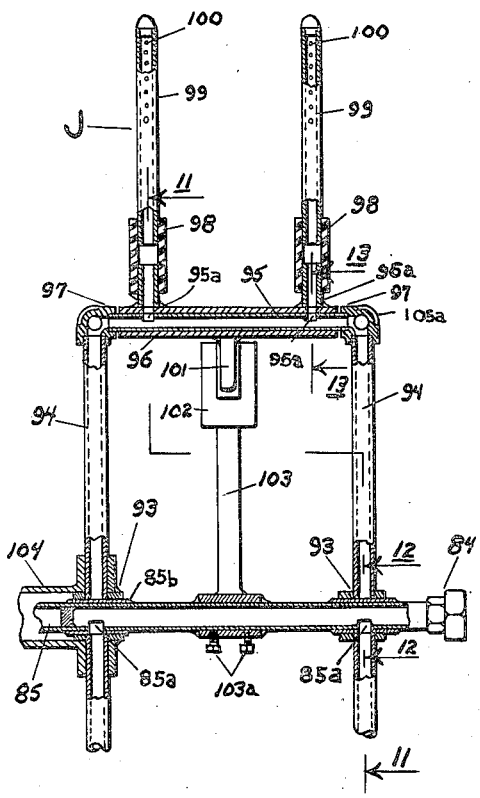
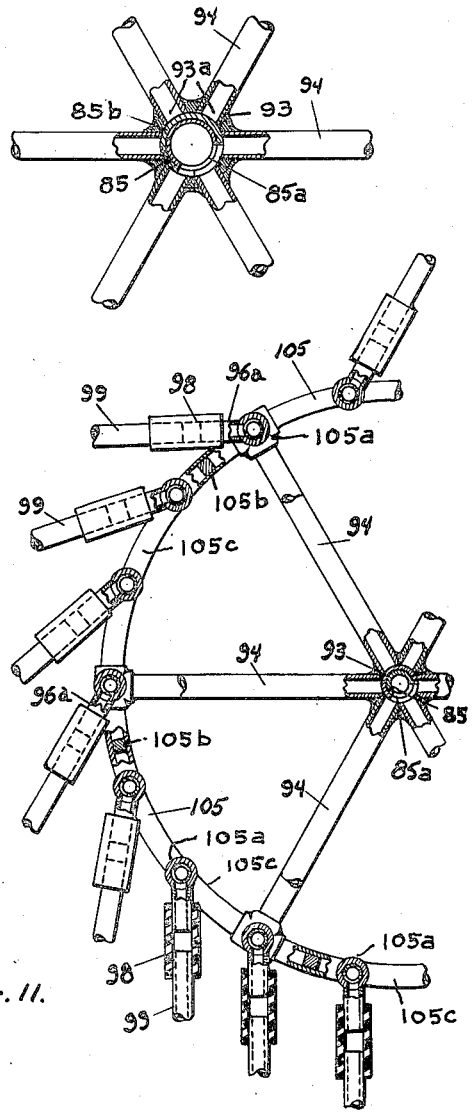
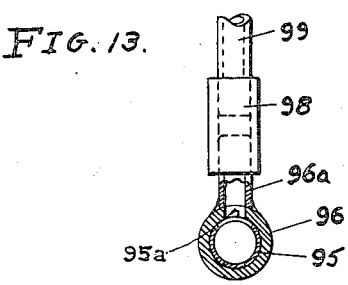
INVENTOR.
JACK D. FRANCIS,
BY
Robert W. Fulwider
ATTORNEY.

Patented Feb. 20, 1951

2,542,500

UNITED STATES PATENT OFFICE 2,542,500

HUMIDIFYING AND MINERAL SALTING DEVICE

Jack D. Francis, Bellflower, Calif.; Edith G. Francis, executrix of Jack D. Francis, deceased, assignor, by mesne assignments, to Edith G. Francis, Bellflower, Calif.

Application December 10, 1948, Serial No. 64,591

3 Claims. (Cl. 99—235)

My invention relates to the field of agricultural machinery, and more particularly to a combined hay humidifying and salting device.

In the baling of hay it is essential that this operation be conducted when the hay is in a moist condition to prevent the leaves and foliage from falling therefrom. As a result, it is common practice to carry out the baling operation either during the night when the hay is covered with dew, or in the early morning before the sun has dried the hay. It is to permit the baling of hay through the night and the heat of the day that I have devised my present invention which is adapted to place hay in the fields in substantially the same condition as when it is covered with dew, and to concurrently spray the hay with a mineral salt solution to make it more attractive as a cattle feed.

A major object of my invention is to provide a hay humidifying and salting device that can be moved in the field by a conventional power vehicle, that will be of a relatively simple mechanical construction, can be fabricated from standard commercially available material, and hence sold at a price which will make possible its purchase by the farmer or rancher having a medium sized farm.

Another object of my invention is to furnish a device that concurrently with increasing the moisture content of the hay may be utilized in adding mineral salts in the desired quantities thereto.

A still further object of my invention is to provide a hay humidifying and salting device that will have all of the necessary equipment for carrying this operation into effect mounted on the supporting trailer, will be relatively simple to operate, and due to the automatic nature of its operation can easily be controlled by the driver of the power vehicle drawing the device by the use of extended lever means.

These and other objects and advantages of my invention will become apparent from the following description of a preferred form thereof, and from the drawings illustrating that form in which:

Fig. 3 is a rear elevational view of the device;

Fig. 4 is a diagrammatic plan view of the device;

Fig. 5 is a vertical cross-sectional view of the generator and preheater taken on the line 5—5 of Fig. 1;

Fig. 6 is a vertical cross-section of the brine tank taken on line 6—6 of Fig. 1;

Fig. 7 is a plan view of the rotatably supported steam jets and the normally stationary hood enveloped jets;

Fig. 8 is a side elevational view of the rotatably supported jets and hood;

Fig. 9 is an end elevational view of the rotatably supported jets and hood;

Fig. 10 is a side elevational view of one of the sets of rotatably mounted jets taken on line 10—10 of Fig. 7;

Fig. 11 is a fragmentary vertical cross-sectional view of the rotatably supported jets taken on the line 11—11 of Fig. 7;

Fig. 12 is a vertical cross-sectional view of the hub valving device taken on the line 12—12 of Fig. 10; and, Fig. 13 is a vertical cross-sectional view of one of the steam jet valves taken on the line 13—13 of Fig. 10.

Figure 1:
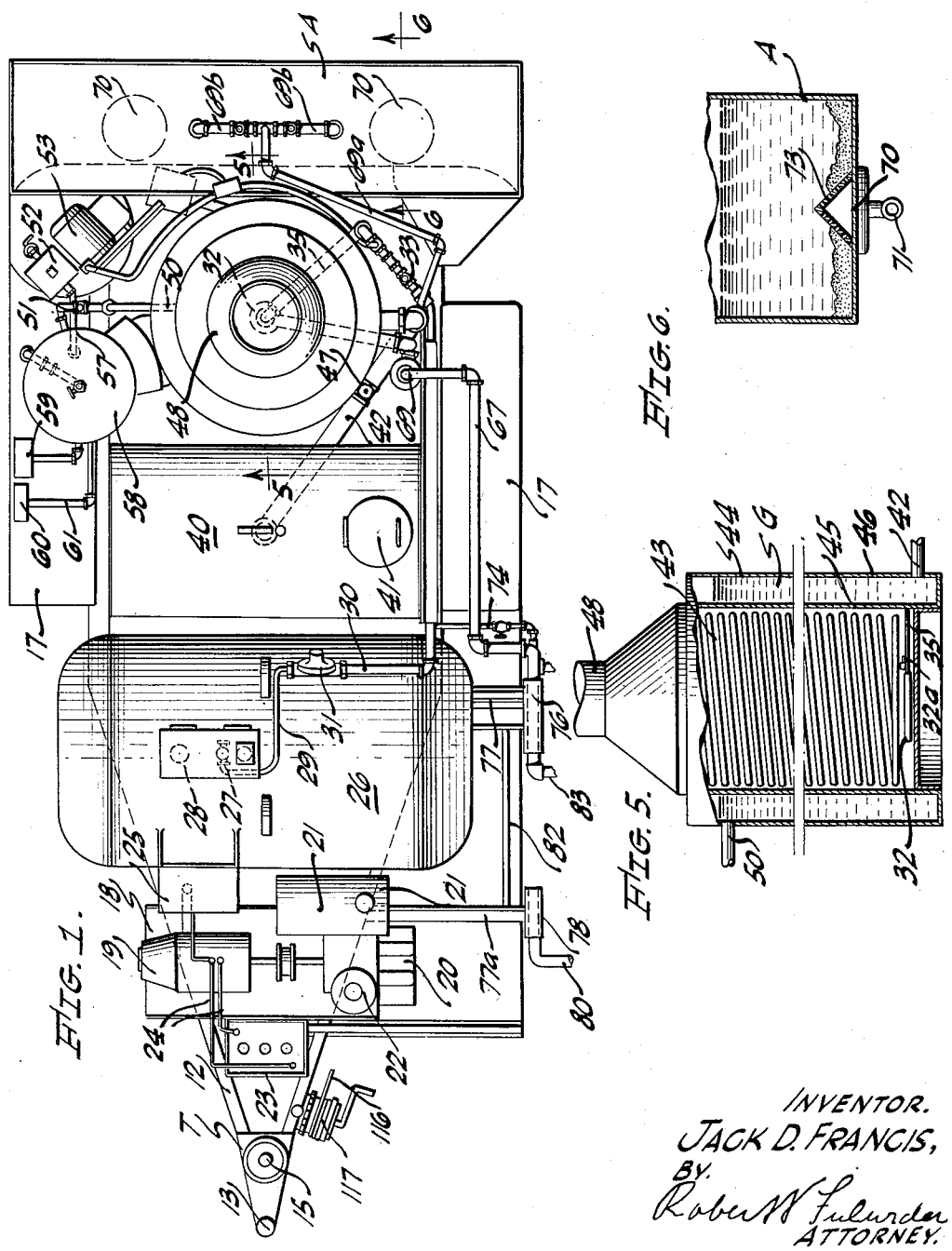
Fig. 1 is a plan view of my hay humidifying and salting device.
Figure 2:
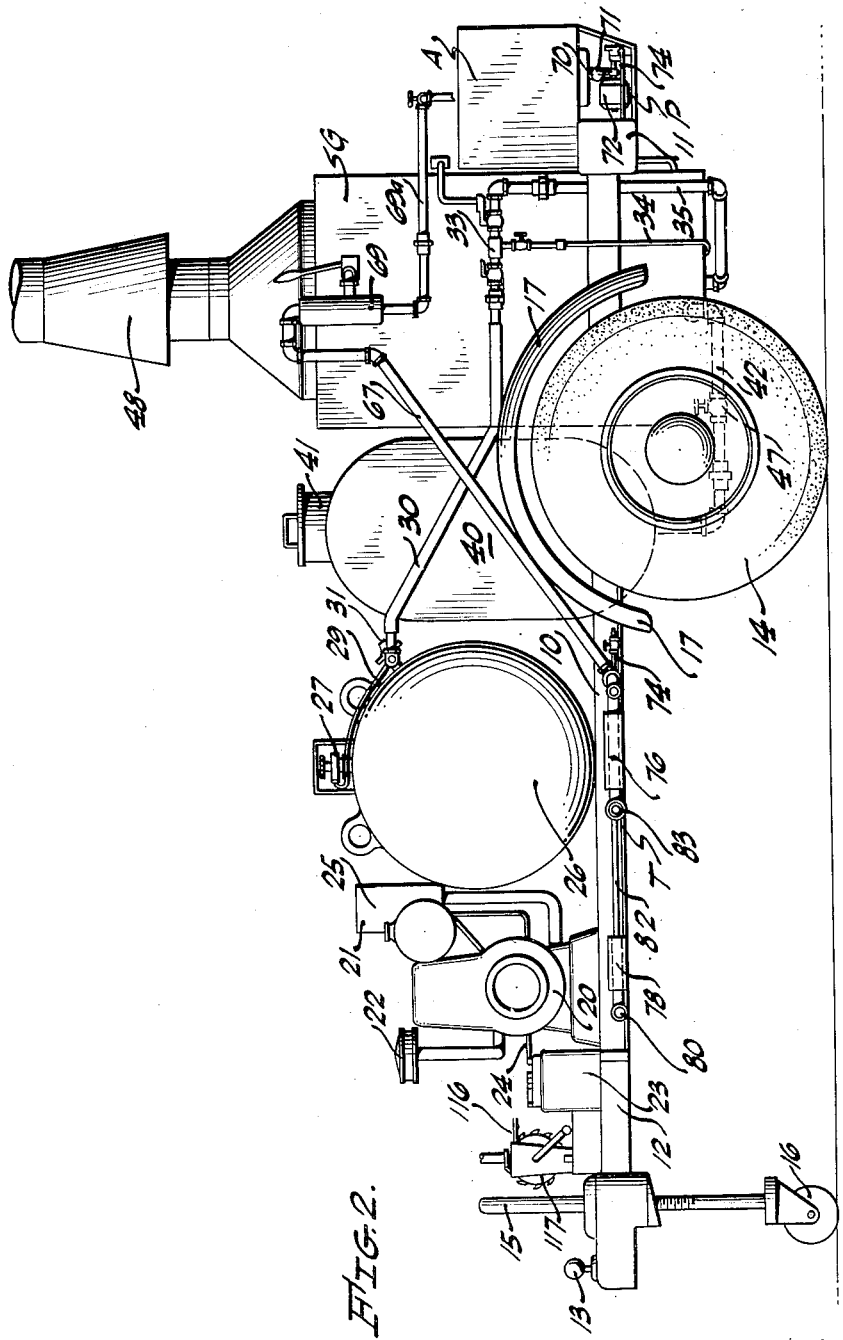
Fig. 2 is a side elevational view of the device.

Referring now to Figs. 1, 2, 3, 7, 8 and 9 for the general arrangement of my invention it will be seen that a trailer T supports a steam generator G that is adapted to supply steam to humidify hay through rotatably mounted jets J and stationary jets S disposed within the confines of a hood H as the device is moved through a hay containing field. A mineral salt solution or other solution having nutritional value is contained in a tank A, and if desired can be introduced by a pump P into the steam prior to its being discharged from the jets J and S.

Although the trailer T can be fabricated in a number of different ways, I prefer to form the bed portion thereof from two laterally spaced side pieces 10 having channel shaped cross-sections which are connected on their rearward portions by an end piece 11. The forward portions of the side pieces 10 are connected by two inwardly extending members 12 which form a V-shaped member, with the apex of the V having supported on the upper surface thereof a trailer hitch 13 of conventional design. Situated under the members 10 and attached thereto by a conventional spring means are laterally spaced pneumatic tired wheels 14 which serve to movably support the trailer. A vertically adjustable rod 15 is located directly behind the trailer hitch 13, and pivotally supports on the lower end thereof a wheel 16 which is utilized in maintaining the trailer T in substantially a horizontal position when it is stationary. To prevent mud or soft dirt being thrown upwardly on to my device when it is being used in soft ground, each of the wheels 14 is provided with a fender 17 of conventional design which is supported from one of the side pieces 10.

A motor generator set 18 is supported on the forward portion of the trailer T, with the base of the generator set extending between the members 12. The motor generator set 18 includes an electric generator 19 of conventional design that is driven by an internal combustion engine 20 from liquid fuel which is contained in a tank 21. The exhaust from the engine 20 is conducted upwardly through a safety head 22 to arrest sparks which may be emitted when the engine is in operation, with the result that the danger of setting fire to the dry hay field in which my device is normally used in eliminated. A storage battery 23 of conventional design is situated forwardly from the motor generator 18, and may be supported from either the members 12 or a bracket of conventional design. A pair of insulated electrical conductors 24 lead from the generator 19 to the battery 23, with the battery being connected to a switch box 25 by a circuit which will hereinafter be described.

Situated directly behind the motor generator set 18, and supported between the side pieces 10 is a cylindrically shaped metallic tank 26 having walls of sufficient thickness to withstand the pressure exerted by butane which is stored therein. The tank 26 as may best be seen in Figs. 1 and 4 is provided on the top thereof with a conventional filling valve 27, and a gauge 28 to indicate the quantity of butane contained in the tank. Extending from the forward side of the valve 27 is a flexible metallic tube 29 which by a suitable fitting is placed in communication with a rigid pipe or conduit 30. Situated in a convenient location in the conduit 30, preferably near the tank 26, is a pressure regulating valve 31 of a conventional design which may be set to reduce the pressure of the butane as emitted from the tank 26 to that required in a burner 32 used in heating the coils of the steam generator G as best seen in Figs. 1 and 5.

The butane after passing through the valve 31 flows through the conduit 30 to a thermostatically operated valve 33. A by-pass line 34 leading from valve 33 to the steam generator G permits butane to flow at all times to a pilot light 32a situated adjacent to the burner 32. The valve 31, however, shuts off the flow of butane through the conduit 30 after the thermostat controlling the valve has been raised to a predetermined temperature to prevent overheating of the coils in generator G. With the valve 33 in the open position butane flows from the tank 26 through the conduit 30, valve 33, and through a conduit 35 to the burner 32 where the butane is ignited by the pilot light 32a.

A water tank 40 is located directly behind the fuel tank 26, and is preferably supported in a transverse position between the trailer side pieces 10. In Fig. 1 it will be noted that the tank 40 is provided with a conventional water inlet 41 on the top thereof, and a discharge line 42 which extends rearwardly to the generator G. In Fig. 5 it will be seen that the steam generator G includes a series of circular steam generating coils 43 which are heated by the burner 32.

The coils 43 are surrounded by a feed water preheater 44 that is formed from an interior and exterior shell 45 and 46 respectively. A stack 48 of conventional design having a spark arrestor incorporated therein is provided for the generator G, and extends upwardly from the feed water heater.

In the operation of my device water flows by gravity from the tank 40 through the pipe 42 into the preheater 44. The flow of water 40 from the preheater 44 is controlled by a manually operated valve 47 that is situated at a convenient location in the pipe 42. After the temperature of the water has been raised by it being situated in the preheater 44 the water is withdrawn through a conduit 50, with the conduit having a shut off valve 51 situated therein at a convenient location, and the conduit being connected to the suction side of a pump 52 that is driven by an electric motor 53. For ease in draining the suction line 50 it is provided at its lowest point with a drain valve 55. Although the pump 52 can be located at any convenient location on the trailer T, I prefer to have it disposed on the rearward right hand side thereof as may best be seen in Fig. 1 for ease in accessibility.

Water is discharged from the pump 52 through a conduit 57 to a steel cylindrical pressure tank 58 that is provided with an air cushion therein whereby the tank serves as an accumulator or air bank for hot water discharged from the pump. By the use of the accumulator 58 a considerable amount of liquid can be stored ready for use, and by utilizing a pressure control valve 59 which is in communication with the tank the electric circuit to the motor 53 can be broken to stop the operation of the pump 52 after a predetermined pressure has been built up in the accumulator 58. As a check on whether the pressure control valve 59 is operating correctly a pressure gauge 60 is connected by a conduit 61 to the accumulator 58, with the gauge 60 indicating the fluid pressure existing therein.

The preheated water contained in the accumulator 58 is at all times under pressure due to the air cushion existing therein, with the water tending to be forced outwardly through a conduit 65 which is provided at a convenient location with a manually operated control valve 66. Conduit 65 is in communication with the lower ends of the steam coils 43.

As the water flows upwardly in the steam coils 43 it is heated by the burner 32 and transformed into steam which flows outwardly from the boiler through a conduit 67. The conduit 67 terminates on its opposite end in a T connection 68. It will be noted that the steam discharge line 67 is provided near the boiler B with a conventional steam trap 69 which has a conduit 69a extending therefrom to the brine box A as may best be seen in Figs. 1, 2, and 3, with the condensate from the steam being used in forming the brine. To permit the even distribution of condensate in the tank A the end of the conduit terminates in a T connection over the tank, with each leg thereof being provided with a manually operated valve 69b.

The tank A as best seen in Figs. 1 and 6 is rectangular in shape, preferably provided with baffle plates, the rearward portion of the trailer T. Two laterally spaced outlets 70 are formed in the bottom of the tank A, and are connected to a common conduit 71 that extends thereunder, with the conduit being connected to the suction side of an electric motor driven pump 72 that is situated at a convenient location on the rearward portion of the trailer T. Extending longitudinally along the bottom of the tank A, and covering the outlets 70 is a perforated member 73 having an inverted L-shaped cross section which serves to prevent the solid mineral salt from obstructing the outlets 70. The discharge of the mineral salt solution from the pump 72 is through a conduit 74 which is connected on its opposite end to one of the legs of the T 68. Extending forwardly from the T 68 is a header pipe 75 which terminates on its forward end in a pipe swivel 76, with the swivel being of a type that is adapted to withstand both the corrosive action of steam and a mineral salt solution.

The swivel 76 is rigidly supported on the extremity of a rigid member 77 that is affixed to one of the side pieces 10 of the trailer T. A similar member 77a is disposed forwardly from the member 77 and is affixed to one of the two inwardly extending frame members 12, with the outer end of the member 77a supporting a swivel 78. A substantially rectangular tubular frame 79 is pivotally supported from the swivel 78 by having an end piece 80 rotatably mounted therein. The frame 79 is also rotatably supported from the swivel 76 by having a member 81 extending inwardly therefrom to engage pipe means of conventional design extending outwardly from the swivel. The frame 79 serves only as a support for the rotatably mounted jets J and the hood H, and at no times carries steam or a mineral salt solution therethrough. To further strengthen the member 77 and 77a a brace 82 formed from a rigid material extends therebetween as can best be seen in Fig. 7.

A steam supply pipe 83 extends upwardly and outwardly from the swivel 76 by the use of conventional pipe fittings, with the pipe terminating on its outer end in a substantially horizontal union 84, and the pipe being supported from the frame 79 by a rigid upright member 79a. A horizontally positioned, stationary, tubular steam header 85 extends outwardly from the coupling 84, and has a cap 86 situated on the outer ends thereof. The cap 86 is held in the desired vertical position by an upright member 87 which is welded or otherwise secured to the frame 79. Additional reinforcing and support for the cap 86 is provided by a number of angularly disposed tubular members 88 which extend downwardly from the cap to the frame 79. Affixed to the lower end of the member 87 is a horizontally positioned shaft 88 which rotatably supports a pneumatic tired wheel 89 to which a pulley 90 is affixed. Extending upwardly from the pulley 90 is an endless belt 91 that engages a pulley 92 which is rotatably supported on the tubular member 85.

Rotatably supported on the member 85 are two laterally spaced hubs 93, with each of the hubs having a number of radially spaced bores 93a formed therein. Each of the bores 93a is in communication with a tubular spoke 94, with each of the spokes terminating on its upper end in a hollow annular rim 105 that has a number of horizontal, circumferentially spaced tubular member 105a extending inwardly therefrom. The members 105a may be screwed, welded or otherwise affixed to the rim 105. In practice it has been found convenient to form the member 105a at the intersection of the outer end of each spoke and rim 105 with a suitable pipe fitting having four suitably disposed legs as may best be seen in Figs. 10 and 11. The members 105a intermediately disposed on the rim 105 between the spokes are preferably formed by welding pipe nipples to the trim, although pipe fitting T's could be used for this purpose if desired. The members 105a are oppositely disposed from one another and are connected by horizontally disposed pipes 95. Each of the pipes 95 has a cylindrical shell 96 rotatably mounted thereon that is provided at each end with a bushing 97 to prevent the escape of steam. Each shell 96 has two laterally spaced steam outlets 96a provided thereon, with the outer end of each outlet engaging a stiff piece of resilient tubing 98 that supports a steam jet or needle 99 having perforations 100 formed along the sides thereof. The pipes 95 each have two laterally spaced bores 95a formed therein which, when brought into engagement with the steam outlets 96a, permits steam to flow from the jets 99 associated therewith.

The header 85 has two laterally spaced downwardly extending bores 85a formed therein that are in vertical alignment with bores 93a. However, it will be seen in Fig. 11 that steam can only flow from header 85 to spokes 94 when the spokes are in a downwardly extending position with bores 85a and 93a in communication with one another. Each of the rims 105 has a number of circumferentially spaced plugs 105b positioned therein, that divides the rim into a number of segments 105c. Each of the segments 105c so formed is supplied with steam through one of the spokes 94 when the spoke is sufficiently downwardly positioned that communication is established between the bore 93a associated therewith and one of the bores 85a.

Each of the shells 96 is provided with a downwardly extending arm 101 that is adapted to engage a cam 102 which is supported on the upper end of an upright member 103, which member is rotatably adjustable on the member 85 by conventional screw means 103a. A cylinder 104 extends inwardly from the pulley 92 over the member 85 to rigidly engage one of the hubs 93, with the result that the wheel 89 while traveling over the ground surface causes the rims 105 to rotate. As the rims 105 rotate, each of the spokes 94 is downwardly positioned for a portion of the revolution, and steam flows from header 85 through bores 85a and 93a to the spoke, as may best be seen in Fig. 11. Steam then flows from the spoke 94 to the pipe segment 105a in communication therewith, and from the segment to the pipes 95 connected thereto. Steam is not discharged from pipes 95 to jets J until the jets start to assume a substantially vertical position at which time outlets 96a and bores 95a are placed in communication with one another. Thus, it will be seen that steam in flowing from header 85 to jets J is controlled at two points; first, by bores 95a being brought into alignment with outlets 96a, and second, by bores 85a and 93a assuming a communicating position. To permit easy rotation of the hubs 93 the header 85 may be provided with two longitudinally spaced tubular members 85b that are formed with polished exterior surfaces on which the hubs rotate. When the hubs 93 are rotatably mounted on members 85b the bores 85a are formed to extend therethrough as may be seen in Figs. 10 and 12.

Extending downwardly and around the frame 79 is a skirt 107, preferably formed of sheet metal, which extends rearwardly from the frame 79, with the rearwardly extending portion being provided with a top 108 to form the hood H. A canvas curtain 109 extends downwardly from the lower edge of the skirt 107 and prevents the steam discharged from the jets J and S being dissipated by currents of air.

Situated within the confines of the hood H is a steam header 110 having a number of perforated pipes extending outwardly therefrom which serve as the steam jets S. In Fig. 8 it will be seen that a valve 112 controls the flow of steam to the jets S. Extending forwardly and connected to the header 110 by conventional pipe fitting 113 is a flexible hose 114 which is adapted to resist both steam and mineral salt solutions. The forward end of the hose 114 is connected in a convenient manner with the steam and mineral salt solution header 75.

In Fig. 8 it will be noted that the hood H has an upwardly extending cable 116 affixed thereto, with the cable extending forwardly by pulley means (not shown) to the forward portion of the nailer where it engages the hand operated winch 117. Thus, by reeling in the cable 116 by use of the winch 117 the rotatably supported jets J, and the hood H can be vertically positioned when the trailer T is being moved from farm to farm or during the time when the device is not being used.

Electricity is supplied from the storage battery 23 to the component parts of my device requiring such energy through the hereinafter described circuit. An insulated electrical conductor 120 is connected on one end to the terminal of the storage battery 23 and on the opposite end is affixed to one of the metallic members 12 to form a ground 121. Another insulated electrical conductor 122 extends from the opposite terminal of the storage battery 23 to the previously mentioned switch box 25 in which it terminates at one terminal of a manually operated switch 123 contained therein.

Extending rearwardly from the opposite terminal 124 of the switch 102 is an insulated electrical conductor 125 that extends to a junction point 126. Connected to the cable 125 at the junction 126 is an insulated conductor 127 that extends to one terminal of the pressure control switch 59. A conductor 128 extends from the opposite terminal of the pressure control switch 59 to one of the terminals of the electric motor 53 which is used in driving the pump 52. The opposite terminal of the motor 53 is connected by an insulated electrical conductor 129 to the frame work of my device to form a ground 121.

An insulated electrical conductor 130 extends from the junction point 126 to a junction point 131. Proceeding from the junction point 131 is a conductor 132 which terminates on one terminal 133 of a manually operated switch 134, with the switch having its opposite terminal connected by a conductor 135 to one terminal of the electric motor driving the pump 72. The opposite terminal of the electric motor on the pump 72 is connected by a conductor 136 that is rigidly connected on its opposite end to a convenient position on the frame of the device to form a ground 121.

An electrical conductor 137 extends from the junction point 131 to a water level control device 138 of conventional design which is placed in communication with the feed water heater at the lowest point where it is safe to operate same by a pipe connection 139. The control 138 is of a type which when the water in the feed water heater is above the elevation of the point to which the pipe 139 is connected, and permits an electric circuit to be completed through the conductor 137 and a conductor 140 which extends from the control device to a solenoid operated valve 141 that is situated in the butane supply line 35. The opposite terminal of the solenoid operated valve 142 is connected by a conductor 142 to a portion of the frame of the machine where it forms a ground 121. During the time the current is flowing through the solenoid operated valve 141 by means of a circuit which includes the conductors 140 and 142 the valve is held in the open position to permit butane to flow through the conduit 35 to the burner 32. However, upon the level of the water in the preheater falling below the elevation where the pipe 139 is connected to the control 138, the circuit is broken between the conductors 137 and 140, and an alarm in the form of a bell which is incorporated in the control 131 and connected by an auxiliary electric circuit (not shown) is caused to operate.

Thus, upon water in the preheater 44 falling to a dangerously low level the control 138 is actuated and the warning device incorporated therein is caused to sound, at the same time the solenoid operated valve 141 is deenergized by the circuit formed from the conductors 137 and 140 being broken, with the result that the valve 141 is placed in the closed position to prevent further heating of the generator G by the burner 32 due to shutting off the fuel supply thereto.

The operation of my invention is extremely simple. The trailer T on which my device is mounted is first connected by the hitch 13 to a conventional power vehicle (not shown). Prior to the device being used in the field, the storage tank 26 is of course filled with butane through the valve 27, and the tank 49 is likewise filled with water through the inlet 41. Likewise, the storage tank 21 is filled with the appropriate liquid fuel for furnishing the fuel supply of the internal combustion engine 20 used in actuating the generator 19.

The pilot light 32a adjacent to the burner 32 is now lighted, and is supplied by butane which flows through the by-pass line 34 thereto. Prior to the pilot light being placed in operation the regulating valve 31 is adjusted to supply butane at the proper pressure for operating both the pilot light and the burner 32. A supply of mineral salt is now placed in the tank A, with there being a surplus of salt in order that further salt solution will be made from the steam condensate which flows from the trap 69 through the conduit 70 to the tank. As the mineral salt is used in the operation of my device, an additional amount of solution is formed by the steam condensate dissolving a portion of the surplus salt situated in the brine tank A.

My device is now ready for operation, and the switch 123 is placed in the closed position. Valve 47 situated in the water discharge line 42 which leads from the tank 40 to the preheater 44 is placed in the open position. Water immediately flows from the tank 40 to the preheater 44, and upon the level of the water reaching an elevation above that of the pipe 139 leading to the electrically operated control 138 the burner 32 is automatically lighted. This lighting operation occurs by the control 138 establishing an electric circuit through the conductors 137 and 140 to the solenoid operated valve 141 which is energized to be placed in the open position, and permits butane to flow through the conduit 35 to the burner 32.

It will be noted in Fig. 4 that upon the switch 123 being placed in the closed position, an electric circuit is completed to supply energy to the component parts of my device from the storage battery 23 by the conductor 120 being connected to a ground 121, and the opposite terminal of the battery being connected by the conductor 122 to the conductor 125. Electricity is furnished to operate the pressure control switch 59 by a circuit which includes the conductor 125 and the conductor 127 being connected to one terminal of the switch 59, with the opposite terminal of the switch being connected by a conductor 128 to one terminal of the motor 53 which is utilized in driving the pump 52. The opposite terminal of the motor 53 is connected by a conductor 129 to the ground 121. The pressure control switch 59 is in communication with the accumulator 58 by a pipe 150.

With the pressure in the accumulator 58 beneath a predetermined amount the pressure switch 59 maintains a completed circuit between the conductors 127 and 128, with the result that the electric motor 53 is actuated to drive the pump 52. As the pump 52 operates warm water is withdrawn from the pre-heater 44 through the suction line 50 to be delivered to the pump 52 from whence it is discharged through the conduit 57 to the accumulator 58. Upon the liquid in the accumulator 58 increasing in volume a cushion of air contained therein is compressed until a predetermined pressure is reached which is transmitted through the conduit 150 to the pressure switch 59 which is actuated by such pressure to break the circuit between the conductors 127 and 128 to stop the motor 53 operating the pump 52. However, upon the pressure in the accumulator 58 falling below the predetermined amount the circuit between the conductors 127 and 128 is again completed by switch 58 to energize the motor 53.

Due to the air pressure in the accumulator 58 the water which has been delivered thereto by the pump 52 tends to be forced from the accumulator through the conduit 65. A manually operated control valve 66 situated in the conduit 65 regulates the rate of flow of pre-heated water to the lower portions of the coils 43 through which it flows upwardly to be transformed into steam by the heat generated from the butane burning in the heater 32. The steam flows outwardly from the upper portion of the coils 43 through the discharge line 67 to the T 68, with the steam condensate accumulating in the trap 69 from which it flows through the conduit 69a to the tank A. The condensate line 69a as may best be seen in Fig. 3 terminates on the rearward end thereof in a T having two legs extending therefrom, with each of the legs having a control valve 69b whereby the distribution of the condensate in the tank A can be controlled.

After the steam from the coils 43 has reached the T 68 it flows forwardly through a conduit 75 to the swivel 76. The steam after passing through swivel 76 enters a header 83 through which it can flow to the rotatably mounted steam jets J which have been previously described, or to the hood enclosed perforated pipes 111 when the valve 112 is in the open position.

When my device is not in operation the hood H and the rotatably mounted jets J are moved into a vertically disposed position by rotating the drum portion of winch 117 to raise the cable 116. After my device has been used, and it is desired to drain condensate which may have accumulated in the header 77 therefrom, the valve 151 which is situated on the forward portion of the header is placed in the open position.

In the use of my device it is frequently desirable in the humidifying of hay to concurrently subject the hay to a spray of a mineral salt solution such as brine. When it is desired to spray the hay with brine the switch 134 is placed in the closed position, and an electric circuit is established from the storage battery 23 to the pump 72 by the conductors 122, 125, 130, 132 and 135 leading to one terminal of the electric motor on the pump, with the other terminal of the motor being connected by a conductor 136 to a ground 121. As the pump 72 is placed in operation the mineral salt solution is withdrawn through the discharge openings 70 situated in the bottom of the tank A into the common header 71 which extends to the suction of the pump 72, with the salt solution being discharged from the pump through a conduit 74 which engages one of the legs of the T 68.

It will be apparent that as steam is being discharged from the coils 43 into one of the legs of the T 68 to flow therefrom through the conduit 75, that the pump 72 must deliver the brine into the T at a higher pressure than that of the steam in order that the brine may be forced through the swivel 76. Due to the high velocity of the steam, the brine is atomized in the T 68 and evenly distributed through the header 83 to be emitted as a fine spray from the jets J and S concurrently with the steam.

The operation of my device is largely automatic, and several auxiliary devices are incorporated in the construction thereof to prevent damage to the device due to carelessness in operation. In Fig. 4 it will be noted that a low level water control alarm 138 is connected to the preheater 44 by a pipe 139. The control 138 so long as there is sufficient water in the preheater permits an electric current to flow through the conductors 137 and 140 to the electrically operated solenoid valve 141 which is energized to remain in the open position whereby butane can pass through the conduit 35 to the burner 32. However, upon the water in the preheater 44 falling to a dangerously low level the control 138 breaks the electrical circuit between the conductors 137 and 140 to de-energize the solenoid operated valve 141. The valve 141 due to spring action immediately assumes the closed position to stop the flow of butane through the pipe 35 to the burner 32 until such time as the water level in the preheater 44 is raised to a safe level. This latter operation is automatic in that when such a rise in the water level occurs the control 138 automatically establishes the circuit between the conductors 137 and 140 to energize the valve 141, which then opens to permit butane to flow through the pipe 35 to the burner 32 where it is lit by the pilot light 32a. At the same time that the control 138 breaks the circuit between the conductors 137 and 140 a warning device which is incorporated in the control is actuated to sound an alarm.

It will be apparent from the previous description of the accumulator 58 and the pressure control valve 59 that the pressure of the preheated water entering the boiler B is controlled not only by setting the control valve 59 to the desired pressure but may also be regulated by the use of the manually operated valve 66 situated in the discharge line 65 leading from the accumulator to the steam coils 43. Another precautionary device which serves to protect the generator G is the thermostatically operated valve 33 which is situated in the butane supply line 30, and has the thermostat element (not shown) situated in the steam discharge line 67 to prevent the temperature of the steam rising to such an elevation that it would damage the hay as it is emitted from the jets J and S.

In operation the trailer T is drawn by a suitable power vehicle along the windrows of hay or other crop which it is desired to humidify. Steam and a salt solution are sprayed on the crop through the jets J and S in the proper amount as previously described. Should it be desired the jets may be used either concurrently or singly depending on the result which it is desired to achieve.

Although the hay humidifying and salting device herein shown and described is fully capable of achieving the objects and providing the advantages hereinbefore stated, it is to be understood that it is merely illustrative of the presently preferred embodiment of my invention, and that I do not mean to limit myself to details of construction herein shown and described other than as defined in the appended claims.

I claim:

1. A hay humidifying and mineral salting device which includes: generator means for supplying steam; means for discharging said steam to humidify hay; pump means to supply a mineral salt solution to said discharge means whereby said salt solution is sprayed on said hay concurrently with said hay being humidified; and a vehicle supporting said generator means and pump means whereby hay can be humidified and salted as said vehicle is moved through a field.

2. A hay humidifying and mineral salt solution applying device which includes: a vehicle; steam supplying means mounted on said vehicle; a hood; means for regulating the vertical height of said hood; a plurality of steam discharge means situated within the confines of said hood; pipe means connecting said steam supplying means with said steam discharge means; a tank adapted to holding a mineral salt solution mounted on said vehicle; and pump means for injecting said solution from said tank into said pipe means whereby said solution is atomized to pass through said discharge means with said steam to concurrently salt and humidify hay as said vehicle is moved through a hay containing field.

3. A hay humidifying and mineral salt solution applying device which includes: a vehicle; a steam generator; rotatably mounted steam discharge means supported from said vehicle; means for rotating said steam discharge means; a tank adapted for containing a mineral salt solution mounted on said vehicle; and pump means for injecting said solution from said tank into said steam discharge means whereby hay situated in a field is concurrently subjected to the humidifying action of said steam and solution as said vehicle is moved through a field having hay situated therein.

JACK D. FRANCIS.

REFERENCES CITED

The following references are of record in the file of this patent:

UNITED STATES PATENTS

| Number | Name | Date |
|---|---|---|
| 506,892 | Wiebe | Oct. 17, 1893 |
| 981,549 | Goodlett | Jan. 10, 1911 |
| 1,251,510 | Grosvenor | Jan. 1, 1918 |
| 1,303,945 | Nichols | May 20, 1919 |
| 1,454,558 | Paton | May 8, 1923 |
| 1,565,282 | Mabee | Dec. 15, 1925 |
| 1,603,136 | Messmer | Oct. 12, 1926 |
| 1,934,826 | Shepherd | Nov. 14, 1933 |
| 2,086,055 | Taylor | July 6, 1937 |